United States Patent [19]
Demuth et al.

[11] Patent Number: 5,648,431
[45] Date of Patent: Jul. 15, 1997

[54] PROCESS FOR THE UTILIZATION OF PLASTICS

[75] Inventors: Michael Demuth, Wallbergstrasse 2, D-8023 Grosshesselohe, Germany; Wolfgang Holzapfel, Berchtesgaden, Germany

[73] Assignee: Michael Demuth, Grosshesselohe, Germany

[21] Appl. No.: 470,158

[22] Filed: Jun. 6, 1995

Related U.S. Application Data

[63] Continuation of Ser. No. 39,140, filed as PCT/EP91/01849, Sep. 27, 1991, abandoned.

[30] Foreign Application Priority Data

| Sep. 27, 1990 | [DE] | Germany | 40 30 588.0 |
| Sep. 27, 1990 | [DE] | Germany | 40 30 614.3 |
| Sep. 27, 1990 | [DE] | Germany | 40 30 639.9 |
| May 10, 1991 | [DE] | Germany | 41 15 379.0 |

[51] Int. Cl.$^6$ ..................................................... C08L 75/04
[52] U.S. Cl. .......................... 525/415; 525/440; 525/454; 521/49; 521/49.5
[58] Field of Search ................... 521/49, 49.5; 525/415, 525/440, 454

[56] References Cited

U.S. PATENT DOCUMENTS

| 3,300,417 | 1/1967 | McElroy | 260/2.3 |
| 4,159,972 | 7/1979 | Braslaw et al. | 260/2.3 |

FOREIGN PATENT DOCUMENTS

| A-0031538 | 7/1981 | European Pat. Off. |
| 2035175 | 3/1972 | Germany. |
| 2738572 | 3/1979 | Germany. |
| 797228 | 6/1958 | United Kingdom. |

*Primary Examiner*—W. Robinson H. Clark
*Attorney, Agent, or Firm*—Sughrue, Mion, Zinn, Macpeak & Seas

[57] ABSTRACT

A process for utilizing compact or porous plastics is described that comprise in part or totally polyurethane plastics, wherein the process is characterized by the fact that the plastics are prepared into a reaction mixture with a low hydroxyl number, which can be further processed in the conventional manner into new final products by swelling the plastics either a) in suitable swelling agents and reducing in size into a free flowing gel; or b) dissolving and/or decomposing in suitable hydroxy polyols; and c) adjusting the hydroxyl number to the desired size;

d) optionally transforming the reaction mixture comprising a), b) and c) into a polyurethane prepolymer, e) further processing the individual reaction mixtures a) to c) into a polyurethane product or into a plastic with the aid of other suitable hardener systems.

34 Claims, No Drawings

PROCESS FOR THE UTILIZATION OF PLASTICS

This is a continuation of application No. 08/039,140, filed as PCT/EP91/01849 Sep. 27, 1991, now abandoned.

The invention relates to a process for utilizing compact and/or porous plastics, which comprise in part or totally polyurethane plastics.

The object of the invention is the industrial utilization of polyurethane products, preferably of polyurethane foam scraps, which are produced in great quantities. During the manufacture of polyurethane (PUR) foams up to 30% of grade pure scrap accumulate. An increasing percentage of products made of integral foams, which themselves are rejected when there are slight surface imperfections but otherwise the quality is flawless from an engineering point of view, e.g., in the production of car seats, necessitates a meaningful utilization, which should take place as much as possible in the domain of its own production.

Used PUR foams, e.g. from the disposal of cars or furniture, are produced in great quantities. They contain in part toxic gases, e.g. chlorofluorinated hydrocarbons, which have been added to improve the manufacturing process and to increase the thermal insulating properties. These gases have to be removed as ecologically safely as possible prior to or during the recycling process. Following the removal of the CFCs, the PUR foams exist usually as material to be ground having a particle diameter ranging from 1 to 3 mm.

This foam flour is stored as special waste at waste dumps. The cost of the final storage is enormously high. Due to the small capacities of dumps, due to the problems of setting up new dumping grounds and due to the chemical resistance and thus the associated small decomposition of PUR foams and their impurities, the recycling of the products for economic re-use offers itself.

The re-use of polyurethane plastic scraps is rendered difficult due to the possible impurities, which are added during production to the polyurethane foams owing to industrial specifications for the corresponding use or are added secondarily during the recycling process, and which can be removed only at great expense. At the same time there is a need for a process that also allows, in addition to the recycling of used PUR material, the recycling of other plastics in the same process.

An example are the impurities of used foam from the disposal of refrigerators. The polyurethane foam contains approximately 5 to 10% CFC; depending on the origin of the refrigerator, the PUR material to be ground contains residual paint and varnish, pieces of paper and metal foil, miscellaneous plastics and pieces of elastomer cables. A total utilization of the waste without additional separating processes is desired, but has not been possible to date. The percentage of impurities is frequently about 10%, but can rise up to about 30% and more.

Another problematic waste is the socalled light fraction from the utilization of cars. About 70% of said light fraction is PUR foam. A number of plastics of varying composition form the remaining 30%. Rubber and polyolefin wastes are just as present as pieces of metal and cables, glass and occasionally wood. The entire waste is polluted with oil and grease, water and brake fluid and every kind of dirt. There is a need to find a cost-effect re-use of this waste, in order to avoid dumping on special dumps.

Therefore, a recycling process, which allows a new product with satisfactory engineering properties to be made from these waste products, is desirable both from an economical and ecological point of view.

In many cases the additional admixture of suitable plastics to the polyurethane products, e.g. to increase the compression strength of hard foam, is desirable. The binding of plastics into a foam matrix can result in an economical improvement and facilitate the disposal, if plastic wastes are used to this purpose.

The use of car seats, for example, that exhibit a fabric layer that serves during production as a separating layer with respect to the metal moulds, increases the strength of the foam surface and improves the sitting comfort, presents a special problem. Therefore, during recycling to date foam and fabric, provided they were recycled at all, had to be mechanically separated and treated separately or recycled. In so doing, the soft polyurethane foams are usually used as flocs to manufacture pillows or underlay carpets; the remaining material is, in contrast, dumped or burned.

The object of the present development is the manufacture of new polyols without secondary products, said polyols being curable with isocyanates or other suitable hardener systems and whose hydroxyl group content can be adjusted to a desired content during the recycling process or through an additional chemical treatment, through the additional admixture of plastics and other fillers, which can be incorporated in a compatible manner into the subsequent new products.

In the patent literature a number of solutions have been proposed to recycle preferably polyurethane foam due to its large surface and thus associated easy processibility into polyols. In so doing, the glycolytic decomposition by means of organic acids, amines or glycols, in part using catalysts, raised pressures and at temperatures at 200° C., occupies the biggest space. None of the methods described can assert themselves, however, for cost reasons. One drawback with the hydrolysis of PUR is also that while carrying out the process secondary products are produced that have to be separated out for toxic reasons and disposed at a high cost. Thus, these methods anticipate only the processing of pure PUR products; impurities have to be removed beforehand or during the process; the equipment and setups required for the process are complicated; the cost of energy is high. Therefore, it is understandable that these methods have not been able to assert themselves and that according to most recent information these processes have hardly any prospect of being used in future.

In addition, the application of the aforementioned methods of the state of the art increases for known reasons during hydrolytic decomposition the hydroxyl number of the polyol produced. The result is an additional consumption of isocyanate during the curing process of the new products. Apart from the associated increase in cost, relatively hard new products are obtained in general, a feature that is undesired in most cases.

Also the system of pyrolytic decomposition that has already been researched on the scale of a pilot plant could not assert itself, since the cost with respect to the benefit was too high and in the case of plastics that were not purely of one kind undesired secondary products occurred that had to be disposed, a feature that in turn raised the cost of the process.

A targeted joint use of PUR products with other plastics with the goal of joint recycling is not known; it is, however, meaningful and necessary.

The invention is based on the problem of developing a recycling process for polyurethane products while avoiding new additional secondary products. In so doing, this process is supposed to facilitate the common utilization and dissolution of polyurethane waste materials with other materials.

Such materials include plastics in the broadest sense, especially those that are bonded, foamed, or mixed with polyurethanes, e.g. covering materials of seats, paper, non-woven fabrics, plastic sheets and/or metal foils, and adhesives, paints, varnishes and optionally elastomers that can be regarded as polymer blends.

Another object of the invention is to preserve as completely as possible the chemical bonds of the polyurethane wastes during the recycling process. If necessary, with the aid of the process according to the invention, following the bonding or dissolution of the polyurethane wastes, the number of the hydroxyl groups of the reactant mixture obtained is to be adjusted optimally for the subsequent further processing.

Furthermore, the object of the invention is also the manufacture of readily further processible prepolymers from the first reaction mixture.

The above problem is solved according to the invention by a process of the aforementioned kind, which is characterized by the fact that the plastics are swollen either a) in suitable swelling agents and are reduced in size into a free flowing gel; or b) dissolved and/or decomposed in suitable polyols; and c) the hydroxyl number is adjusted to the desired size;

d) optionally the reaction mixture comprising a), b) and c) is transformed into a polyurethane prepolymer, e) the individual reaction mixtures a) to c) are further processed into a polyurethane product or into a plastic with the aid of other suitable hardener systems.

Furthermore, the invention includes a device to implement the process, wherein the device, which comprises a reaction vessel with stirring apparatus and condenser and protective gas devices, and is characterized in particular by the fact that said device exhibits at least in part linings with a dehydration catalyst in the form of, e.g. baffles or plate-shaped sliding surfaces or granular, dispersible surfaces.

All PUR plastics that are manufactured according to the diisocyanate polyaddition process, and their chemical modifications in compact and/or porous form, can be universally recycled with the aid of the process of the invention.

The process of the invention allows the concomitant use in the dissolving process and the addition of soluble plastics, resins and waxes to the agents, wherein the same can be added prior to, during or following the actual dissolving process. Such plastics can be for example: polyvinyl chloride, styrene/acrylonitrile (24–29%), polyhydroxyether of bisphenol A, polycarbonate, nitrocellulose, cellulose butyrate, cellulose propionate, polyepichlorohydrine, polyvinylidene chloride, styrene/allyl alcohol copolymers.

Partially compatible plastics, e.g. polypropylene, poly (butene-1), polyethylene, natural rubber, styrene/butadiene elastomers, styrene/butadiene block copolymers, unsaturated polyesters, polyvinyl acetate, polyvinyl butyral, polybutadiene, ethylene/propylene rubber, polyisobutylene, polyoxymethylene, polyoxyethylene, can be introduced by way of solutizers.

In addition, with the process of the invention it is possible to add to new PUR products for further processing components that have a positive impact on their chemical properties, e.g., the introduction of flame-retarding chemical groups into the freshly produced polyol.

The process steps of the process of the invention can be conducted simultaneously or in succession.

The first step in the recycling of plastic wastes is granulation and, if necessary, cleaning.

Grade pure PUR foam wastes, irrespective of whether they are hard, soft, polyether, or polyester foam or their mixtures, are granulated, if necessary, into flocs ranging in size from 10 to 50 mm; cleaning is superfluous.

In the case of CFC-containing or polluted wastes or in the case of mixtures with other plastics and in the case of compact PUR wastes, they are ground to a particle size ranging from 1 to 2 mm and freed of soluble dirt.

Most plastics do not dissolve in organic solvents until they have first swollen by means of the solvent and passed through a gel state prior to the final dissolution. During this gel phase the chemical bonds are still intact. The solvent merely forces apart the individual polymer chains without resulting in any real dissolution. The gel layer formed thus inferes in many cases with the dissolution of the polymers and elastomers, since said gel layer prevents the fresh solvent from diffusing.

It is well-known with polyurethane foams that they swell significantly in organic solvents. Polyurethane soft foams can absorb an amount of swelling agents that corresponds to their own volume. With a suitable choice of swelling agent the degree of swelling can even amount to a multiple of the volume of the initial foam, without a significant decomposition of the chemical bonds or without hydrolytic dissociations occurring.

By means of swelling, a gel is obtained in which the chemical bonds are still preserved and that still exhibits strength, even if low strength. Depending on the swelling agent and temperature, the foams retain their structure or become slimes, which still exhibit, however, a certain strength and oppose further foaming with such great resistance that to date the use of swollen foams has not been carried out in the recycling of polyurethane plastics.

It has now been found that these gels can be refoamed after all, if they are subjected to a mechanical treatment by means of size reduction prior to further processing.

According to the process of the invention for recycling polyurethane wastes, the wastes are, therefore, swollen in suitable swelling agents, and granulated in a suitable manner forming a free-flowing gel, which together with the components that are necessary for forming polyurethane and with or without the addition of additives can be further procesed into new polyurethane products.

In particular equipment, in which high shear and impact forces in connection with cavitation and ultrasonic occur as in the case of ultrasonic mills (multi-chamber impellers), is suitable to reduce in size the highly viscous gel obtained following the swelling process of the polyurethane wastes. For example, a device, which is marketed under the name "Supraton" by Krupp Buckau Maschinenbau GmbH, Grevenbroich, is suitable to carry out the process according to the invention. The effect of these forces results in a mechanical granulation of the gel, which can now be pumped, poured and metered and can be readily refoamed.

It has been found surprisingly that masked and/or amino-modified polyether polyols ready dissolve PUR plastics on heating and that this solution can be reprocessed easily immediately or later into new PUR products.

Masked polyether polyols are offered and marketed under the name Voranol in the delivery program of Dow Chemical Company Midland (Mich.) USA. The products Voranol CP 3003 Polyol, Voranol CP 4610 Polyol, Voranol CP 4711 Polyol, Voranol CP 4810 Polyol and Voranol RA 640 Polyol and RA 800 Polyol easily dissolve on heating polyester and/or polyether foams, irrespective of whether hard or soft foam. In the temperature range between 120° and 200° C., the foams are dissolved within the minimum period of time. The dissolving time can be shortened by mechanical treatment. The temperature of 250° C. should not be exceeded, since otherwise brown discolorations must be taken into account.

As an alternative the polyurethane wastes can be swollen in one operation together with the swelling agent in the ultrasonic mill and can be simultaneously reduced in size to a free flowing gel. This process is especially suitable for soft polyether foams that have been previously granulated to nut size. The advantage of this preparation lies in the fact that the separate swelling process and a costly mechanical granulation are dispensed with, since only pregranulated foam particles are used. It is possible with this process to process large quantities of foam in a short period of time and thus to improve the feasibility of the recycling process.

According to the invention two kinds of swelling agents can be used in principle: those that react with the isocyanate and those that are inert to isocyanate.

The use of the first group is recommended. Representatives of the second group, e.g. low boiling hydrocarbons, are interesting when they can serve as foaming agent in the subsequent production of foam. Swelling agents can be liquid or solid at room temperature, but must be liquid at the operating temperature. Polyols of all kind serve as the swelling agent. Especially interesting is the use of polyester and polyether polyols, which serve for the manufacture of soft and/or hard foams. When foam material wastes are utilized directly in the production, the starting polyols can be used. During the immediate treatment in the factory foam production, the waste foam, which is still not completely cured, can be readily swollen and added in the gel form to the polyol isocyanate mixture for refoaming. No addition of hardener is necessary for the gel, provided its presence is significantly reduced. With the addition of swelling foams it can be necessary in some cases to add an excess amount of hardener for safety sake. Besides these polyols as swelling agents, which can vary in their reactivity, molecular weight and functionality, chain extenders with di- or polyvalent alcohols, glycols, and polyglycols can also be used, since they readily swell the used foams.

Amines, as used in polyurethane chemistry, represent another group of swelling agents. Here, above all, the alkanol amines are interesting, since they do not exhibit a high steam pressure and the production properties of the foams can be optimally effected. Furthermore, diamines, such as hydrazine, and ketamines as well as tertiary amines whose catalytic action is very desirable in further processing are suitable.

Various plasticizers, especially plasticizers based on esters such as phthalates, citrates and the like, provided they are compatible with the final product and do not interfere with the development of foam, are also suitable as swelling agents.

Urea, dissolved in glycol, represents a good swelling agent. Even small amounts of urea result in a significant reduction in the swelling temperature.

In addition, carboxylic acids of any kind are quite usable as the swelling agent, in particular polycarboxylic acids. Provided the polyurethane wastes are polluted with metal foils, they facilitate as adhesive agents their integration into the new foam. Native fatty acids, also in the form of polymers, are just as suitable.

In addition, the following are suitable as swelling agents or additives to the same:

esters of fatty acids; they themselves or in other systems can be readily foamed.

native oils such as linseed oil or tall oil, which can also serve as the additive for existing foam systems.

The addition of wetting agents, e.g. in the form of surface active silicon-organic compounds or fluorine chemicals, also facilitates the swelling.

OH functional polymer derivatives of polybutadiene or isoprene can be used as the swelling agent, provided they are not polymerized too high.

The present list of swelling agents represents only a small choice. The swelling agents can be used among each other. The choice is based on the present foams and the quality of the final product that is desired at a later date.

For the purpose of swelling, the granulated polyurethane wastes, optionally in the presence of small amounts of impurities, are added to the swelling agent in a ratio of 10 to 50% by wt., preferably 20 to 30% by wt. With the addition of the swelling agent the foam volume can remain in essence the same or increase. This feature depends on the type of polyol used, the polyurethane waste (hard or soft foam) and the degree of cross-linking of the polyurethane.

Freshly manufactured foam swells the easiest immediately after its production, when it has not yet completely cured. Therefore, the process according to the invention is especially good for the reutilization of foam wastes immediately following production. The degree of swelling can range from a few percents to 100 or more percent. Soft foams lead to soft, smooth gels or even to slimy products; the transitions up to sol are sliding. In any case a chemical decomposition of PUR should be avoided.

Hard foams show occasionally swelling products, which still exhibit a relatively high strength. Following treatment in a multichamber impeller, they lead, however, to uniform, freely flowing gels, which can be refoamed without difficulties. The mixture of swelling agent(s) and gel can be fed directly to granulation. If desired, a part of the swelling agent can be separated out by centrifugation.

The polyurethane foams can be swollen at room temperature or to increase the rate of swelling at raised temperatures. The temperature should be chosen, however, only so high that a hydrolytic disassociation can still not occur, and should, therefore, not exceed 100° C. Preferably one works in the range of 50° to 60° C. This is also the temperature in ultrasonic mills under normal conditions due to the high shear forces.

The free flowing gels manufactured in this manner can be stored separately for some time. An occasional increase in viscosity can be prevented or delayed by cooling.

The polyurethane wastes processed into a free flowing gel as described above can be mixed in the following into a specified polyurethane foam recipe with suitable composition and refoamed. If polyols are used as the swelling agent with or without other additives, one foams through the addition of an amount of isocyanate that is equivalent to the reactive hydrogen atoms in the gel, with or without suitable additives and catalysts. Depending on the amount to be added and the properties of the used foam, the properties of the new polyurethane product are effected. Since the bulk of the bonds in the PUR waste does not have to be hydrolyzed, the amount of isocyanate necessary for refoaming is reduced, and is limited to the amount necessary for the new foam, eventually with the addition of an excess for that portion of the polyurethane that decomposes.

The process can be applied preferably for soft and semi-hard foams and can also be used in productions where several different qualities of foam are produced. The swollen and granulated old foams can be reprocessed into foam or also into sheets or mouldings, where the quality of the new products can vary with the addition of the gel particles. The desired quality has to be developed by the corresponding pilot tests and is based on the existing polyurethane waste and the polyurethane system used. Especially suitable is the present process for the immediate utilization of polyurethane wastes, resulting from the continuous production, in particular of foams. It is possible to subject the resulting wastes such as crust sections or misproductions immediately to the swelling and granulation process and then immediately or at a later point in time reintroduce directly into fabrication. The addition of swelling foams for utilization in continuous production changes the engineering properties of the final product only insignificantly or not at all. This is especially important for foam producers with a wide production spectrum.

The di- and tri-functional polyols with primary hydroxyl groups, wherein the difunctional polyols swell faster, have proven to be good swelling agents. The same applies to the polyols of this group with low molecular weight. A significant difference in the swelling behavior as a function of the hydroxyl number could not be determined. At temperatures above 150° C. this polyol group results in the polyurethanes dissolving. In addition, plastics such as polyamides, unsaturated polyesters and alkyd resins can be dissolved. Mixtures of gel and dissolved plastic are obtained that can be easily cured with isocyanates.

The epsilon caprolactones have proven to be an extremely interesting group.

Monomers, polymers and copolymeric lactones and/or their derivatives or mixtures of the same, in particualr epsilon caprolactone polyols and epsilon caprolactone acrylate polyols show excellent dissolving characteristics with respect to polyurethane plastics; soft and hard foams based on polyethers or polyester polyols can be dissolved, resulting also in the plastics of a different nature dissolving at the same time.

Epsilon caprolactone polyols and their derivatives can be used in the form of monomers, oligomers and polymers as solvents for plastics. In the case of monomers, however, the polymerization has to be prevented through the addition of inhibitors, e.g. mono or polycarboxylic acids.

With an increasing degree of polymerization and decreasing hydroxyl content, the solubility of the plastics improves in these solvents. The high molecular polymers are compatible with virtually all plastics and can dissolve them, thus, e.g., polyolefins, olefin resins, vinyl resins, polyamides, phenolic and urea resins, cellulose derivatives and a number of elastomers, including natural rubber. The list is not complete; it is supposed to indicate the possible mixtures, which are also possible among each other.

Good, in part outstanding results are also obtained when epsilon caprolactones of varying degree of polymerization, hydroxyl content and varying composition are used.

Lactone polyols, in particular polymeric derivatives of epsilon caprolactone, e.g. commercially available epsilon caprolactone polyols and epsilon caprolactone acrylate polyols, dissolve polyurethanes in the form of hard or soft foams easily and without secondary products, also in the presence of other plastics, paints, and varnishes as well as resins and waxes. Typical for the monomeric epsilon caprolactone is the easy ring fission of the seven member ring in reaction with compounds, which exhibit reactive hydrogen atoms, e.g. alcohols, amines and water. The result is hydroxycaproic acid esters, hydroxycaproinamides and hydroxycaproic acids. The solution can be reprocessed without any problems into foam, foils, or pourable compounds. Granulated impurities due to paper or cardboard, metal and/or plastic foils do not interfere with the production of foam.

The aforementioned epsilon caprolactone polyols and epsilon caprolactone acrylate polyols are prepared according to the following reaction diagram:

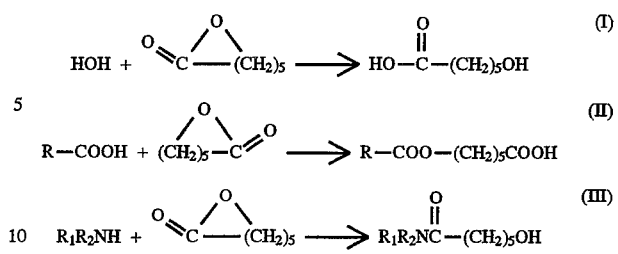

The above compounds can be polymerized in a well-known manner into epsilon caprolactone polyols and epsilon caprolactone acrylate polyols. For the conversion with acid carboxylic acid is used, preferably hydroxycarboxylic acids or unsaturated acids such as acrylic acid or in particular preferably unsaturated hydroxycarboxylic acids. $R_1R_2NH$ in the above general formula III stands in general for primary ($R_2$=H) and secondary organic amine compounds. In particular, $R_1R_2NH$ denotes amines such as ethylene diamine, ethanol amine and/or aromatic amines.

The degree of polymerization of the polymers obtained in this manner lies in the range of 500 to 5,000, preferably 500 to 3,000. The hydroxyl number ranges from approximately 200 to 20-30, where the hydroxyl number decreases with increasing molecular weight and lies in the range of the high polymers from 2 to 5. Readily extrudable high polymers having a molecular weight ranging from 20,000 to 40,000 with hydroxyl numbers between 2 and 5 can also be obtained.

The use of the aforementioned polyols is advantageous with respect to the final products obtained that exhibit an improved flexibility, higher toughness, better stability (ultraviolet/moisture resistance).

When implementing the process of the invention the viscosity of the reaction mixture rises significantly, a feature that indicates that the polyurethane plastics are in essence only dissolved and only slightly decomposed.

A preferred example of a caprolactone acrylate monomer is the product marketed by Union Carbide under the name Tone® M-100, The difunctional groups present in the acrylate derivatives allow for further polymerization a conversion of the hydroxyl group and/or by way of the acryl double bond. The above compound Tone® M-100 monomer is characterized especially by a very low steam pressure, which is below the acrylates that are usually used.

To accelerate the dissolution process, the polyurethane plastics can be granulated beforehand. Provided the foam wastes are contaminated with paper or cardboard, native fibers or synthetic cellulose fibers, granulation of the wastes to a particle size of preferably <1 mm is advised. Following the dissolution process a defibrillation is necessary, in order to expose the individual fibers; they do not interfere with the refoaming process; in some cases a stabilization of the rising foam compound is observed. Of course, fibers that are insoluble in the solvent have to be well distributed in the respective compound. Synthetic fibers are to be treated like the corresponding plastics. Provided they are soluble, they are incorporated either swollen or dissolved in the subsequent polyurethane system. Virtually all dyes, lacquers and paints dissolve in epsilon caprolactone polyols and epsilon caprolactone acrylate polyols. They do not interfere with the further processing. Elastomers, which are present in a particle size of <1 mm, are incorporated in the ground form or in the partially dissolved state. Aluminum and laminated films can be added into the dissolution process as material to be ground. In the case of pure aluminum foils a small addition of polycarboxylic acids is logical; they facilitate the reception into the matrix of the final products and act as adhesive agents to metallic surfaces. The additives present in the foam such as flame retardants, fillers, biocide agents, antiooxidants, catalysts and accelerators do not interfere either during the dissolution or during the subsequent further processing.

In utilizing the polyurethane plastics, optionally in the presence of impurities and additives, no free, in particular toxic secondary products are produced; the compound obtained can be filled into containers and be further processed either immediately or later. There are no problems with storage. The solid and/or waxy compounds have to be heated prior to further processing until they can be pumped or metered. They can be converted into prepolymers; in this manner the viscosity and/or the processing temperature can be reduced. Immediately before further processing, isocyanate compounds and other additives are added to the compound obtained thus; and it is refoamed into polyurethane products. The lactone solution, containing the decomposed polyurethane plastics, can also be used as the additive for other polyurethane systems. Soft or hard foams of varying quality can be manufactured. It depends, among other things, on whether di- or tri-functional epsilon caprolactone polyols are added. Furthermore, the molecular weight and the hydroxyl number of the polyols play a role here.

Epsilon caprolactone polyols exhibit exclusively primary hydroxyl groups and an aliphatic polyester chain, resulting in a high stability to hydrolysis, excellent low temperature characteristics and very good resilience. The degree of polymerization lies with narrow limits. In this manner soft foams of low density at lower manufacturing temperatures are obtained. These properties are transferred to the secondary polyurethane products. On the basis of the uniform structure of the epsilon caprolactone polyols or the epsilon caprolactone acrylate polyols, the properties of the final polyurethane products are, therefore, narrowly defined. Such products can also incorporate varying raw materials of varying properties and origin, without the properties of the secondary products differing too much. Mouldings, sheets or foam can be made from the reaction products. The new foams can be used to fill cavities; in-situ foams can be made.

Epsilon caprolactone acrylate polyols have the following advantages:

The slight polymerizibility of the caprolactone derivatives results in uniform polymerization products with a narrow distribution of molecular weights; this results in low viscosities and melting points, a feature that is advantageous for dissolving foams. For this purpose monomeric and polymeric epsilon caprolactone acrylate polyols, regardless of whether mono-, di- or tri-functional, are especially suitable.

The dissolution and/or decompositon of the polyurethane plastics can be conducted batch-wise or continuously at temperatures ranging from 100° to 200° C. For the thermal treatment heatable agitated tanks, in particular those that can be pressurized, are suitable. The best results are obtained, of course, with continuous through-flow machines such as kneaders, heatable screw presses or similar devices.

To accelerate the dissolution and/or decomposition, catalysts can be added. However, the use of alkali salts must be in essence abandoned due to the occurrence of side products, which have to be separated out prior to further processing. The rate of dissolution is accelerated by amines; here, in particular, tertiary amines such as morpholines, and tertiary amines with active hydrogen atoms such as triethanol amine, and their reaction products with ethylene oxide or propylene oxide, are named.

Through the addition of urea the solubilization and/or decomposition temperature can be lowered into the range of 100° to 120° C. Glycols, in particular diethylene gylcol, which strongly promotes the swelling of the foams, can also be added to the caprolactone acrylate in order to accelerate the dissolution.

Other examples than those listed here can be used as catalysts, but only those should be used that do not result in compounds that can disturb the subsequent reactions or that decompose the catalysts into toxic liquid or gaseous substances, and must, therefore, be washed or separated out.

Depending on the amount of polyurethane foam added, clear to turbid, liquid to waxy solutions are obtained. It has been demonstrated that the dissolution and/or decomposition does not have to be 100%. During the subsequent further processing, e.g., into foams, those portions of the polyurethane foam that are only partially decomposed do not interfere in the least.

During the swelling process, in particular however during the dissolution and decomposition of the polyurethanes, in most cases it is necessary to decrease the hydroxyl number, in order to keep the amount of isocyanate necessary for cross-linking low for cost reasons. In addition, softer PUR foams are obtained, if the number of possible cross-linking points is reduced. In addition, it is desirable to work, if possible, with identical raw materials and thus identical recipes during production.

In other cases the increase in hydroxyl number is necessary in order to obtain harder final products. Both corrections are relatively easy to accomplish.

The hydroxyl number can be reduced through partial esterification of the OH groups. Besides mono-, di- or polycarboxylic acids, dimerized acids or acid anhydrides, fatty acids or unsaturated acids can be used. The choice of acid is based on the engineering properties that the final product is supposed to exhibit.

Inorganic acids can be used, and this is preferred, such as sulfuric or phosphoric acid, or organo-phosphoric acids. The phosphoric acids have the advantage that their salts can serve in the final products as flame-retardant additives. In the case of inorganic acids the esterification can be readily terminated through the addition of metal oxides or calcium salts. These reaction products can either remain in the system as fillers or be easily filtered off.

The esterification of the OH groups according to the methods of preparative chemistry represents another method.

An effective method for reducing the OH groups is the dehydration of the OH groups. The simplest method is the acid-catalytic dehydration using catalysts, e.g. zinc salts, metal zinc or precious metals such as palladium.

Since the reduction relates only to a portion of the hydroxyl groups, there is the possibility of conducting this operation already during the swelling or dissolution process in a reaction tank lined totally or partially with catalysts. Since this reaction runs in an acidic environment, suitable additions must be made. The acids added also react with esterification, so that in any event an exact control of the reaction through continuous determination of the hydroxyl number is necessary. The termination of the reaction is again quite possible through neutralization through calcium salts.

As soon as the desired hydroxyl number is attained, which is recognized through analytic monitoring of the reaction process, the reaction must be terminated, the temperature reduced and the desired solids must be separated out.

Prepolymers in the processing of polyurethanes comprise polyols, which were pre-reacted in part or in excess with NCO. They are important when the reaction speed of the polyols present is to be increased. Among other things, the undesired high steam pressure, e.g. of TDI (toluylene diisocyanate) can be reduced in this manner. In this case the mixing ratio during further processing approximates preferably the ratio 1:1.

Another reason for using prepolymers can be to avoid isocyanates with high steam pressure. High melting and pasty systems can be processed at low temperatures by means of pre-reaction. Other reactive groups can be incorporated that contain, e.g. vinyl, phenol, epoxy on acylamino terminal groups, which allow the use of other hardening systems. The plurality of reaction possibilities increases through the manufacture of prepolymers, and in the case of dissolved used PUR materials the quality of the final products is raised to the same level.

The swelling and optionally dissolution of the plastics and the auxiliary processes such as dehydration and manufacture of prepolymers have to be conducted under defined conditions. It is preferred to conduct the reactions under protective gas atmosphere. The removal of reaction products such as water must be possible. The entire reaction must be conducted in a closed system. Undesired secondary products, undissolved plastics and other impurities, must be separated out.

The polyol solution obtained as the reaction mixture is cooled and can be immediately further processed by adding it continuously to the material throughput of the starting components for the manufacture of polyurethane plastics. Preferably the prepared reaction mixture is fed directly to the mixing head of the multi-component mixers, a feature that allows a continuous and especially effective operation. As an alternative the prepared reaction mixture can be further processed at a later point in time.

EXAMPLE 1

24 kg of a trifunctional epsilon caprolactone polymer having a molecular weight of 540, a hydroxyl number of 310, a viscosity of 200 m.Ps.s at 55° C. and a specific weight of 1.072 are heated to 180° C. while stirring. 24 kg of flocculated soft foam scraps are added continuously into this heated solution. Following the addition, the mixture is stirred for about another hour. A clear, moderately viscous solution is obtained that is cooled to 60° C. 2.0 parts of water, 1.0 part of silicone foam stabilizer, 1.5 parts of DMEA (dimethylethanolamine), based on 100 parts, are added to the mixture. This mixture is mixed with 140 parts of MDI (diphenylmethane-4-4'-diisocyanate) in a high pressure foam moulding machine. A fine pored hard foam having a bulk density of 24 kg/m$^3$ and high compression strength is obtained.

EXAMPLE 2

24 kg of the hydroxy polymer from example 1 are heated to 190° C. 12 kg of a PUR foam mixture comprising hard and soft foam wastes and 12 kg of polycarbonate wastes are added continuously to the mixture. The mixture is cooled to 80° C. after 1 hour of stirring. Following addition of catalysts, water and silicone stabilizers in proportion to that in example 1, 100 parts of clear mixture are foamed, after addition to 120 parts of MDI, in a high pressure machine. A fine-pored, pressure-resistant hard foam having a bulk density of 26 kg/m$^3$ is obtained that offers itself for use as in-situ insulating foam.

EXAMPLE 3

40 kg of a hydroxy polymer as in example 1 are heated to 50° C. 10 kg of granulated foam pieces of soft and hard consistency from the disposal of refrigerators with a particle size distribution ranging from 0.01 to 2 mm are metered into the through-flow in a premixer. The foam contains impurities of approximately 10%, which comprise residual paint and varnish, paper, adhesives, aluminum foils and elastomers. The mixture is forced through a multi-chamber impeller, whereby it is heated to approximately 60° to 80° C. A paste is obtained whose polyurethane plastic contents are swollen partially superficially, but in essence totally. The paste can be readily treated with the additives from example 1 and be foamed with MDI in proportion to 100 parts of reaction mixture and 130 parts of isocyanate in a low pressure mixer. A fine-pored hard foam with high compression strength is obtained. The swelling bodies can no longer be recognized in the foam. The undissolved metal foils are uniformly distributed in the foam; they reinforce the foam strength. The formation of foam, the rise time and a density of 30 kg/m$^3$ are also obtained in the comparison test without the addition of used foam.

EXAMPLE 4

Car shredder, 75% of which comprises soft PUR foam and which is provided with pieces of PVC sheets, polyurethane sheets, rubber lines and cable wastes and styrene plastics, pieces of wood and light metal, is granulated to a particle size ranging from 0 to 3 mm and liberated from oil, grease, brake fluid and dirt by washing with hot water, containing wetting agents, and subsequently dried. 24 kg of this flour are treated at 300 rpm in 24 kg of a trifunctional caprolactone polyol with a hydroxyl number of 310 and a molecular weight of 540 at 180° C. A viscous liquid is obtained, in which there are undissolved particles, comprising wood, epoxy resin residues, rubber and metal foils. The solid impurities are filtered off. The mixture is treated at 80° C. with the foam forming agent from example 1, whereby, however, the amount of catalyst is halved. The 100 parts of this mixture are cured with 130 parts of MDI. Following a rise time of 60 seconds a hard, homogeneous, fine-pored foam having a density of 30 kg/m$^3$ and high compression strength is obtained.

EXAMPLE 5

A reaction mixture having a hydroxyl number of 380 comprising difunctional epsilon caprolactone polyol and dissolved pieces of PUR soft foam in equal parts is conveyed so long past zinc plates at 180° C. in the acidified medium until a hydroxyl number of 300 is obtained. Upon completion of the reaction 500 g of calcium carbonate are added and the mixture is filtered. The liquid compound is treated with the same catalysts as in example 1 and treated with MDI at a ratio of 100:90 in a high pressure mixer. A fine-pored, tough and resilient foam is obtained. The starting solution, whose hydroxyl number was not reduced, is foamed in the same manner; the foam is just as uniform and fine-pored but harder than the foam, manufactured from the reaction solution with the reduced hydroxyl number.

EXAMPLE 6

91 kg of epsilon caprolactone polymer as described in example 1 are treated with 39 kg of mixed foam wastes and stirred at 180° C. Upon completion of the addition, the mixture is stirred for another hour; the total stirring time is 2.5 hours. A highly viscous polyol is obtained whose viscosity is too high for processing in a high pressure system. 130 kg of this mixture are then mixed with 26 kg of MDI under nitrogen and stirred at 50° C. for 3 hours, The mixture is mixed with MDI at a ratio of 100:100 without other additives at this temperature in a high pressure machine. A foam with a rise time of 30 seconds and a density of 35 kg/m$^3$ is obtained. The foam structure is fine-pored, uniform and mixed open and closed pored.

EXAMPLE 7

The polymer mixture from example 6 is mixed with the catalysts as in example 1 and then foamed under the same conditions as in example 6 but at room temperature. The reaction time is so short that processing is not possible. A coarse pored, pitted foam structure is obtained that comprises primarily closed pores and collapses severely after about 1 hour. The density cannot be determined on account of the structure.

We claim:

1. Process for utilizing compact or porous plastics, which comprise polyurethane plastics, without producing any toxic or secondary products, said process consisting essentially of
    a) swelling the polyurethane plastics in a swelling agent selected from the group consisting of polyols, hydrocarbons, amines, plasticizers, urea, carboxylic acids, esters of fatty acids, native oils, wetting agents, and/or OH functional polymers obtained from either polybutadiene or isoprene at a temperature below the decomposition temperature of the polyurethane plastics while avoiding hydrolytic dissociation to thereby form a gel in which chemical bonds are preserved, wherein the decomposition temperature is a temperature at which hydrolytic dissociation occurs;
    b) reducing the gel in size by mechanically granulating the gel into a free flowing gel while avoiding hydrolytic dissociation, wherein the free flowing gel is a granulated gel that can be pumped, poured and metered; and
    c) reacting said gel with a diisocyanate to form a new polyurethane plastic.

2. Process for utilizing compact or porous plastics, which comprise in part or totally polyurethane plastics, without producing any toxic or secondary products, said process comprising
    a) swelling the polyurethane plastics in a swelling agent at a temperature below the decomposition temperature of the polyurethane plastics;
    b) reducing in size into a free flowing gel;
    c) dissolving the gel into a polyol to form a solution, wherein said polyol is selected from masked and/or amine-modified polyether polyols corresponding to the trade products Voranol® of the types Voranol® CP 3003 Polyol, Voranol® CP 4610 Polyol, Voranol® CP 4711 Polyol, Voranol® CP 4810 Polyol, Voranol® RA 640 Polyol, and Voranol® RA 800 Polyol, and copolymerizates of ε-caprolactone with hydroxyl group-containing acrylates, styrene-alcohol-copolymers or polyesters; and
    d) reacting said solution with a diisocyanate to form a new polyurethane plastic.

3. Process, as claimed in claim 2, wherein the polyol is ε-caprolactone with terminal hydroxyl or acrylate groups with different degrees of polymerization.

4. Process, as claimed in claim 1, wherein polyols, hydrocarbons, amines, plasticizers, urea, carboxylic acids, esters of fatty acids, native oils, wetting agents, and/or OH functional polymer derivatives of polybutadiene or isoprene are used as a swelling agent.

5. Process, as claimed in claim 4, wherein polyester- and/or polyether polyols, which may have terminal, primary hydroxyl groups, masked or blocked polyols, ε-caprolactone polyols and/or ε-caprolactone acrylate polyols are used as a polyol swelling agent.

6. Process, as claimed in claim 1, wherein plastics that contain, besides polyurethane plastics, additional plastics, resins, waxes, elastomers, paints, varnishes, paper, metal foils, and organic and/or mineral fibers are used as the compact or porous plastics.

7. Process, as claimed in claim 2, wherein plastics that contain, besides polyurethane plastics, additional plastics, resins, waxes, elastomers, paints, varnishes, paper, metal foils, and organic and/or mineral fibers are used as the compact or porous plastics.

8. Process, as claimed in claim 6, wherein compact or porous plastics as recited in claim 6 and optionally other additives, optionally in dissolved or swollen form, are added before, during and/or after preparation of the new polyurethane plastic to modify the new polyurethane plastic.

9. Process, as claimed in claim 7, wherein compact or porous plastics as recited in claim 30 and optionally other additives, optionally in dissolved or swollen form, are added before, during and/or after preparation of the new polyurethane plastic to modify the new polyurethane plastic.

10. Process, as claimed in claim 8, wherein plasticizers, flame retardants, pigments, fillers and/or fibers are used as additives.

11. Process, as claimed in claim 9, wherein plasticizers, flame retardants, pigments, fillers and/or fibers are used as additives.

12. Process, as claimed in claim 1, wherein compact and porous plastics and optional additives are pregranulated in a cutting mill or shredder to a particle size ranging from approximately 10 to 30 mm and optionally further finely granulated in a centrifugal mill to a particle size of <1 mm in diameter.

13. Process, as claimed in claim 12, wherein the pregranulated plastics together with the swelling agent are simultaneously swollen and granulated in a multi-chamber impeller subject to action of high shear and impact forces in connection with cavitation and/or ultrasonics, thereby forming a free-flowing gel.

14. Process, as claimed in claim 2, wherein surface-active substances and/or solubilizers are added to accelerate the swelling and/or dissolving.

15. Process, as claimed in claim 2, wherein the gel or solution has a hydroxyl number which is adjusted in accordance with desired properties of the new polyurethane plastic.

16. Process, as claimed in claim 15, wherein the hydroxyl number is adjusted by
    a) esterifying with organic acids, inorganic acids, acidic anhydrides and/or organophosphoric derivatives;
    b) etherifying;
    c) converting with amino resins; and/or
    d) catalytically dehydrating with a metal dehydration catalyst with or without addition of acidified additives.

17. Process, as claimed in claim 16, wherein the hydroxyl number is adjusted by catalytically dehydrating in a device lined with a dehydration catalyst.

18. Process, as claimed in claim 17, wherein zinc or palladium is used as the dehydration catalyst.

19. Process, as claimed in claim 6, wherein fiber-containing plastics are defibrillated following preparation in order to expose individual fibers.

20. Process, as claimed in claim 2, wherein said gel or solution is reacted with an isocyanate to form a new polyurethane plastic which is used as a prepolymer that can be polymerized to form a polyurethane product.

21. Process, as claimed in claim 2, wherein said gel or solution is added to material throughput during a PUR refoaming operation and/or into a mixing head of a PUR mixer.

22. Polyurethane products, obtainable by a process according to any of the preceding claims.

23. Free flowing polyurethane gel obtainable by a process according to steps a) and b) in claim 1.

24. Process for utilizing compact or porous plastics, which comprise polyurethane plastics, without producing any toxic or secondary products, said process comprising
 a) swelling the polyurethane plastics in a swelling agent at a temperature below the decomposition temperature of the polyurethane plastics, wherein the decomposition temperature is a temperature at which hydrolytic dissociation occurs;
 b) reducing in size into a free flowing gel, wherein the free flowing gel is a granulated gel that can be pumped, poured and metered;
 c) dissolving the gel into a polyol to form a solution, wherein said polyol is ε-caprolactone with terminal hydroxyl or acrylate groups with different degrees of polymerization; and
 d) reacting said solution with a diisocyanate to form a new polyurethane plastic.

25. Process, as claimed in claim 24, wherein plastics that contain, besides polyurethane plastics, additional plastics, resins, waxes, elastomers, paints, varnishes, and organic and/or mineral fibers are used as the compact or porous plastics.

26. Process, as claimed in claim 25, wherein compact or porous plastics as recited in claim 25 and optionally other additives, optionally in dissolved or swollen form, are added before, during and/or after preparation of the new polyurethane plastic to modify the new polyurethane plastic.

27. Process, as claimed in claim 26, wherein plasticizers, flame retardants, pigments, fillers and/or fibers are used as additives.

28. Process, as claimed in claim 24 wherein surface-active substances and/or solubilizers are added to accelerate the dissolving.

29. Process, as claimed in claim 24, wherein the solution has a hydroxyl number which is adjusted in accordance with desired properties of the new polyurethane plastic.

30. Process, as claimed in claim 29, wherein the hydroxyl number is adjusted by
 a) esterifying with organic acids, inorganic acids, acidic anhydrides and/or organophosphoric derivatives;
 b) etherifying;
 c) converting with amino resins; and/or
 d) catalytically dehydrating with a metal dehydration catalyst with or without addition of acidified additives.

31. Process, as claimed in claim 30, wherein the hydroxyl number is adjusted by catalytically dehydrating in a device lined with a dehydration catalyst.

32. Process, as claimed in claim 31, wherein zinc or palladium is used as the dehydration catalyst.

33. Process, as claimed in claim 24, wherein said solution is added to material throughput during a PUR refoaming operation and/or into a mixing head of a PUR mixer.

34. Polyurethane products, obtainable by a process according to an claims 24–33.

* * * * *